United States Patent [19]
Fung

[11] Patent Number: 5,909,224
[45] Date of Patent: Jun. 1, 1999

[54] APPARATUS AND METHOD FOR MANAGING A FRAME BUFFER FOR MPEG VIDEO DECODING IN A PC ENVIRONMENT

[75] Inventor: Hei Tao Fung, Campbell, Calif.

[73] Assignee: Samsung Electronics Company, Ltd., Seoul, Rep. of Korea

[21] Appl. No.: 08/733,436

[22] Filed: Oct. 18, 1996

[51] Int. Cl.[6] .................................................. G06F 13/00
[52] U.S. Cl. ........................ 345/508; 345/509; 345/521; 345/202; 348/416; 348/584; 348/715; 348/718
[58] Field of Search ...................................... 345/508, 509, 345/202, 501, 520, 521, 502; 348/411–416, 409, 423, 714–718

[56] References Cited

U.S. PATENT DOCUMENTS

| | | | |
|---|---|---|---|
| 5,278,647 | 1/1994 | Hingurani et al. | 348/390 |
| 5,510,842 | 4/1996 | Phillips et al. | 348/416 |
| 5,576,765 | 11/1996 | Cheney et al. | 348/416 |
| 5,668,599 | 9/1997 | Cheney et al. | 348/416 |
| 5,729,279 | 3/1998 | Fuller | 348/584 |

*Primary Examiner*—Kee M. Tung
*Attorney, Agent, or Firm*—Skjerven, Morrill, MacPherson, Franklin & Friel LLP; Ken J. Koestner

[57] ABSTRACT

A four-buffer MPEG decoder is provided for decoding MPEG video frames. A four-buffer frame controller and control method manage the four frame buffers including decoding, displaying and discarding of I-frames, P-frames and B-frames so that video data decoding is accelerated. The four-buffer frame controller and control method frees one frame buffer when the frame buffer contains obsolete data, defined as data which is no longer useful for decoding additional frames and for which storage is not necessary for displaying pictures in a correct temporal order. One example of an obsolete frame is a B-frame that is displayed. Another example is a P-frame for I-frame which is no longer used for motion compensation and has been displayed.

24 Claims, 11 Drawing Sheets

APPARATUS AND METHOD FOR MANAGING A FRAME BUFFER FOR MPEG VIDEO DECODING IN A PC ENVIRONMENT

BACKGROUND OF THE INVENTION

1. Field of the Invention

The present invention relates to a Moving Pictures Expert Group (MPEG) video decoder. More specifically, the present invention relates to an apparatus and operating method for managing frame buffers for decoding of video frames.

2. Description of the Related Art

Standardization of recording media, devices and various aspects of data handling, such as audio recording, storage and playback, is highly desirable for continued growth of this technology and its applications. One compression standard which has attained wide spread use for compressing and decompressing video information is the moving pictures expert group (MPEG) standard for audio and video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition Aug. 1, 1993 (hereinafter referred to as MPEG International Standard).

Pictures defined by the MPEG standard are divided into 16×16 pixel macroblocks. Each macroblock has six 8×8 blocks including four luminance (Y) blocks, one chrominance red (Cr) block and one chrominance blue (Cb) block. The luminance blocks correspond to sets of 8×8 pixels on a display and control the brightness of respective pixels. The chrominance blocks control the colors for sets of 16×16 pixels. A set of 2×2 pixels on the display use a single Cr characteristic and a single Cb characteristic.

Three types of pictures of video information are defined and classified in the MPEG standard, intra-frames (I-frame), forward predicted pictures (P-frame) and bi-predicted pictures (B-frame).

An I-frame is encoded and decoded independently from other pictures in a video sequence as a single image having no reference to any past or future picture. Each block of an I-frame is encoded and decoded independently. Accordingly, when decoding an I-frame, no motion processing is necessary. However, I-frames are stored and accessed for use in decoding other types of pictures.

A P-frame is predicted from previous I-frames or P-frames. A P-frame is encoded and decoded relative to a most recent past reference picture where the reference picture is a P-frame or an I-frame. A macroblock in a P-frame is encoded as either an I-macroblock or a P-macroblock. A P-macroblock is stored as a translated 16×16 area of a past reference picture plus an error term. To specify the location of a P-macroblock, a motion vector which indicates the relative position of the macroblock in the current picture to the position of the translated area in the past reference picture is also encoded. A subsequently decoded P-macroblock includes the 16×16 area from the reference picture offset according to a defined motion vector. In this manner, the decoding of a macroblock inherently includes motion compensation with error-correction using inverse discrete cosine transform (IDCT) error terms which are defined on a block by block basis.

A B-frame is related to both the previous P-frames or I-frames and the future P-frames or I-frames. Thus, a B-frame is encoded relative to the most recent past reference picture and a next future reference picture. The decoding of a B-frame is similar to P-frame decoding with the exception that a B-frame motion vector may refer to areas in the future of the reference picture. For macroblocks that use both past and future reference pictures, 16×16 areas are averaged. The macroblocks from the reference pictures are offset using motion vectors.

A frame, whether an I-frame, P-frame or B-frame, cannot be simply decoded, displayed and discarded due to motion-compensation in which a frame is decoded based on other frames. P-frames and I-frames are retained in a frame buffer memory so that B-frames can be encoded and decoded based on the P-frames and I-frames. An I-frame and a P-frame are also retained in a frame buffer memory so that the frames are displayed in the correct temporal order. For example, encoded frames may be arranged in an order, as follows:

1I 4P 2B 3B 7P 5B 6B 10P 8B 9B 13I 11B 12B.

For such an arrangement of encoded frames, the correct display order is, as follows:

1I 2B 3B 4P 5B 6B 7P 8B 9B 10P 11B 12B 13I.

I-frame 1I and P-frame 4P are decoded and stored in frame buffers. I-frame 1I is displayed when an End-Of-Process (EOP) signal is received, signifying that the display of a previous frame is finished and a new frame may be displayed. B-frame 2B is decoded from the stored I-frame 1I and the stored P-frame 4P, displayed and discarded when the presentation is finished. Similarly, the B-frame 3B is decoded from I-frame 1I and P-frame 4P, displayed and discarded when the presentation is finished. The P-frame 4P is then displayed. Not until the P-frame 7P is decoded is the I-frame 1I discarded since the I-frame 1I is used for decoding the B-frames 2B and 3B and typically the P-frame 7P, but not needed for decoding of B-frames 5B and 6B. I-frame 1I is discarded and replaced with P-frame 7P which is decoded using the P-frame 4P and usually the I-frame 1I. The minimum number of frame buffers for decoding and displaying MPEG frames is three so that P-frames and B-frames can be decoded an all frames are displayed in the correct temporal order.

A three-buffer MPEG decoder is optimum for conserving circuit size but may have difficulty in meeting timing requirements in some implementations, including personal computer (PC) implementations.

What is needed is a multiple-buffer MPEG decoder that includes a sufficient but conservative amount of video buffering and meets stringent timing requirements of versatile PC environments.

SUMMARY OF THE INVENTION

In accordance with the present invention, a three-buffer MPEG decoder has been found insufficient for handling video decoding in a multitasking personal computer (PC) environment. Many conditions of multitask processing aggravate the difficulties inherent with a three-buffer MPEG decoder. For example, multitask processing inherently shares a common display buffer between multiple applications. In addition, timing in a PC graphics environment is compromised by the difference between video presentation frame rate and actual video frame rate. Furthermore, timing difficulties in a three-buffer MPEG decoder are heightened by including picture post-processing capabilities.

The sharing of a common display buffer among multiple applications is highly advantageous in a multitasking PC environment. In an illustrative hardware embodiment, when a display screen is refreshed, a DMA controller scans through a memory consistent with the size of a defined screen resolution and transfers data to the display screen according to the configuration defined by a chroma key, a key that controls display of a graphic overlay. If the various applications executing in the multitasking environment include pictures to be displayed at different memory addresses that are different than the relative locations of the pictures on the display screen, the DMA controller needs to change the contents of internal registers during the scan to display the appropriate pictures at the correct time. Unfortunately, typical DMA controllers do not include this capability.

In an illustrative embodiment, conversion between pictures in a multitasking environment is achieved using a video driver to assign a common display buffer for all applications. The video driver sizes the common display buffer to represent all pixels on the display screen, then allows the various applications to write pictures to the common display buffer according to a desired configuration of pictures on the screen. Although the common display buffer is sized to represent all pixels, the frame buffers are generally allocated a smaller size. For a three-buffer MPEG decoder, one of the three buffers typically resides on the common display buffer. The MPEG decoder buffer residing on the common display buffer is inaccessible when the common display buffer is scanned and is only available after the scan is complete. Only a short time period, called a vertical synchronization time period, is available during which a B-frame picture must be decoded to comply with the presentation schedule of the frame. This time requirement is stringent and difficult to achieve using a three-buffer MPEG decoder. When a conflict occurs between multiple applications which simultaneously attempt to access a frame buffer, the decoding process is stalled and all applications accessing the buffer are stalled.

Timing is compromised in a PC graphics environment since video presentation frame rates are typically higher than MPEG frame rates. In the PC environment, the monitor is refreshed at a rate controlled by a graphics controller. Typical rates are 60 Hz, 70 Hz, and 72 Hz. In contrast, common MPEG frame rates are 25 Hz and 30 Hz. Thus, for one MPEG video frame, two or three presentations would appear on the display screen.

The difference in frame rates reduces the length of time permitted to decode a picture and retain a picture in the memory but introduces a degree of freedom which allows timing manipulation to achieve audio/video synchronization. For example, one presentation may be dropped or one presentation may be added to temporally match the video presentation with the audio presentation. This synchronization technique is discussed in more detail in U.S. patent application Ser. No. 08/733,437, entitled "APPARATUS AND METHOD FOR SYNCHRONIZING AUDIO AND VIDEO FRAMES IN AN MPEG PRESENTATION SYSTEM", Fung, H. T., filed on the same day as the present application, which is incorporated by reference herein in its entirety. This synchronization technique reduces the time interval permitted to decode a picture and retain a picture. A three-buffer MPEG decoder does not permit video frame acceleration to synchronize a lagging video frame due to lack of storage.

Timing difficulties in a three-buffer MPEG decoder are heightened by picture post-processing operations. Examples of picture post-processing operations include format conversion to 4:2:2 or other formats to comply with various hardware graphics controllers. Picture interpolation may be necessary in the case of a deformed display window. Special effects commonly utilize filter post-processing. All post-processing operations impose a time expenditure. Often a three-buffer MPEG decoder is insufficient for handling post-processing operation requirements.

In accordance with the present invention, a four-buffer MPEG decoder is provided for decoding MPEG video frames. A four-buffer frame controller and control method manage the four frame buffers including decoding, displaying and discarding of I-frames, P-frames and B-frames so that video data decoding is accelerated. The four-buffer frame controller and control method frees one frame buffer when the frame buffer contains obsolete data, defined as data which is no longer useful for decoding additional frames and for which storage is not necessary for displaying pictures in a correct temporal order. One example of an obsolete frame is a B-frame that is displayed. Another example is a P-frame for I-frame which is no longer used for motion compensation and has been displayed. An illustration of the four-buffer frame controller and control method is illustrated in an example, as follows:

| (1I) | (4P) | (2B) | ( ) | Three frames are decoded and stored in three frame buffers. |
|---|---|---|---|---|
| [1I] | (4P) | (2B) | (3B) | Frame 1I is displayed, and frame 3B is decoded. |
| (1I) | (4P) | [2B] | (3B) | Frame 2B is displayed. |
| (7P) | (4P) | ( ) | [3B] | Frame 3B is displayed, frames 1I, 2B are discarded, frame 7P is decoded. |
| (7P) | [4P] | (5B) | ( ) | Frame 4B is displayed. Frame 5B is decoded. |
| (7P) | (4P) | [5B] | (6B) | Frame 5B is displayed. Frame 6B is decoded. |
| (7P) | ( ) | (10P) | [6B] | Frame 6B is displayed. Frames 4P, 5B are discarded, Frame 10P is decoded. |

The illustrative method of operation by is controlled by a four-buffer frame controller which discards a B-frame at the time the B-frame is displayed and discards a P-frame or I-frame after the frame is displayed at the time the P-frame or I-frame is no longer used for motion compensation. The illustrative four-buffer frame controller advantageously confers upon the MPEG decoder a greater probability of decoding a frame prior to presentation in the four-buffer decoder because frame buffers are more readily available.

Many advantages are achieved by the described synchronization system and operating method. One advantage is that the addition of a frame buffer supports multitask access to the display screen. Another advantage is that the usage of additional frame buffers according to the described technique accelerates video frame decoding, promoting audio/video synchronization when the video presentation lags the audio presentation. It is advantageous that the additional frame buffer facilitates timing of post-processing applications.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
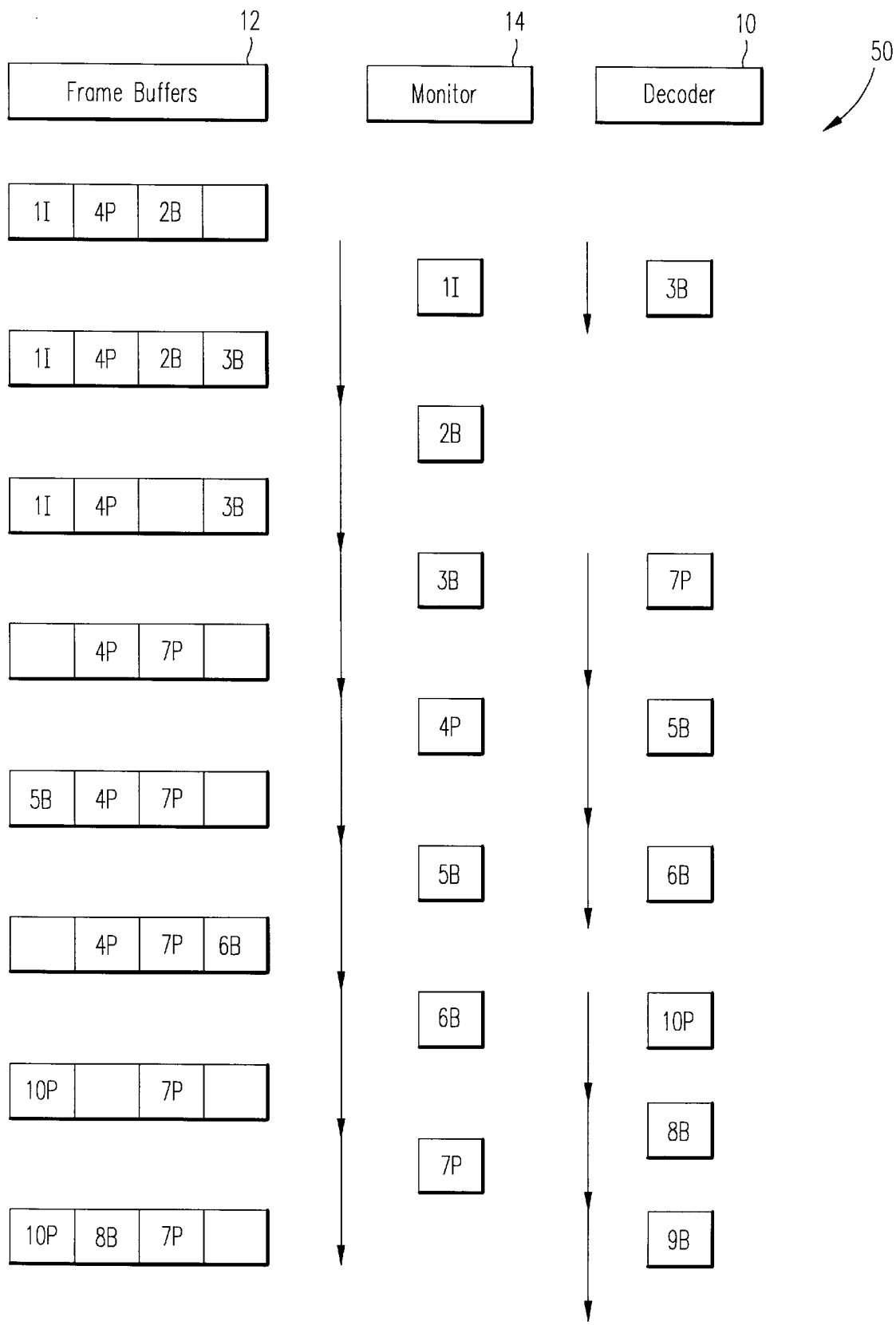
FIG. 1 is a pictorial timing diagram which illustrates the operation of a first embodiment of a four-buffer MPEG decoder for decoding MPEG video frames.

Referring to FIG. 1, a pictorial timing diagram illustrates the operation of a four-buffer MPEG decoder for decoding MPEG video frames. Frame data are decoded by a decoder 10, stored in the four frame buffers 12, and displayed on a display screen or video graphics monitor 14. Initially I-frame 1I, P-frame 4P and B-frame 2B have been decoded and are stored in three buffers of the four frame buffers 12. FIG. 1 shows that the state of the four frame buffers 12 is defined for a time frame during which the frame stored in the individual buffers is constant. The video graphics monitor 14 displays a frame in synchrony with the time frame. The decoder 10 decodes and stores frame data asynchronously with respect to the time frame.

In a first time frame, the I-frame 1I is displayed on the video graphics monitor 14 and the decoder 10 decodes B-frame 3B, which is stored in a buffer of the four frame buffers 12. In a second time frame, the B-frame 2B is displayed on the video graphics monitor 14. A B-frame always becomes obsolete upon display so B-frame 2B is discarded. In a third time frame, the B-frame 3B is displayed on the video graphics monitor 14 and a P-frame 7P is decoded by the decoder 10 and stored in a buffer of the four frame buffers 12. The B-frame 3B is displayed and, therefore, obsolete and is discarded. The I-frame 1I has been previously displayed and is no longer used for motion compensation and is therefore obsolete and discarded. In a fourth time frame, the P-frame 4P is displayed on the video graphics monitor 14 and the decoder 10 decodes the B-frame 5B, which is stored in a buffer of the four frame buffers 12. In a fifth time frame, the B-frame 5B is displayed on the video graphics monitor 14 and the decoder 10 decodes the B-frame 6B for storage in the four frame buffers 12. The B-frame 5B is displayed, becomes obsolete, and is discarded. In a sixth time frame, the B-frame 6B is displayed on the video graphics monitor 14 and the decoder 10 decodes the P-frame 10P and stored in a buffer of the four frame buffers 12. The B-frame 6B is displayed, becomes obsolete, and is discarded. The P-frame 4P has been previously displayed and is no longer used for motion compensation and is therefore discarded. In a seventh frame, the P-frame 7P is displayed on the video graphics monitor 14 and the decoder 10 decodes the B-frame 8B, which is stored in a buffer of the four frame buffers 12.

The method of operation illustrated by FIG. 1 is controlled by a four-buffer frame controller 50 which discards a B-frame at the time the B-frame is displayed and discards a P-frame or I-frame after the frame is displayed at the time the P-frame or I-frame is no longer used for motion compensation. The illustrative four-buffer frame controller 50 advantageously confers upon the MPEG decoder a greater probability of decoding a frame prior to presentation in the four-buffer decoder because frame buffers are more readily available.

A pseudocode representation of a program code for freeing frame buffers is shown, as follows:

```
FreeFrameBuffer(int CurrentTemporalReference, int
TemporalReference[NumberOfBuffers], int
PicType[NumberOfBuffers]) {
  int OldBFrameCount = 0;
  int NonBFrameCount = 0;
  int SmallestTempRef;
  SmallestTempRef = CurrentTemporalReference;
  for (int I=0; I<NumberOfBuffers; I++) {
    if(PicType[I]==B_FRAME) {
      if(TemporalReference[I]<SmallestTempRef) {
        OldBFrameCount++;
        BufferNumber = I;
        SmallestTempRef = TemporalReference[I];
      } else {
        NonBFrameCount++;
        if (TemporalReference[I]<SmallestTempRef) {
          BufferNumber = I;
          SmallestTempRef = TemporalReference[I];
        }
      }
    }
    if(OldBFrameCount>0)/* at least one outdated B-frame*/
      BufferStatus[BufferNumber]=AVAILABLE;
    elseif ((NonBFrameCount>2)&&(TemporalReference[BufferNumber]<
      CurrentTemporalReference))/* >=3 non-B-frames with one
      outdated*/
      BufferStatus[BufferNumber]=AVAILABLE;
}
```

The program code for freeing frame buffers is called following a presentation of a picture or after a single picture is decoded. The program code for freeing frame buffers first determines whether one or more obsolete B-frames is contained in a frame buffer then determines whether three or more non-B-frames reside in the frame buffers. In either case, a frame buffer is available. The temporal reference of the associated picture indicates the order of presentation. The program code for freeing frame buffers routine is written assuming that temporal references are handled correctly by other routines. The routine for freeing frame buffers discards the presented B-frame when a B-frame is obsolete and discards the obsolete non-B-frame which is the oldest of the three non-B-frames when three or more non-B-frames reside in the frame buffers.

Figure 2:
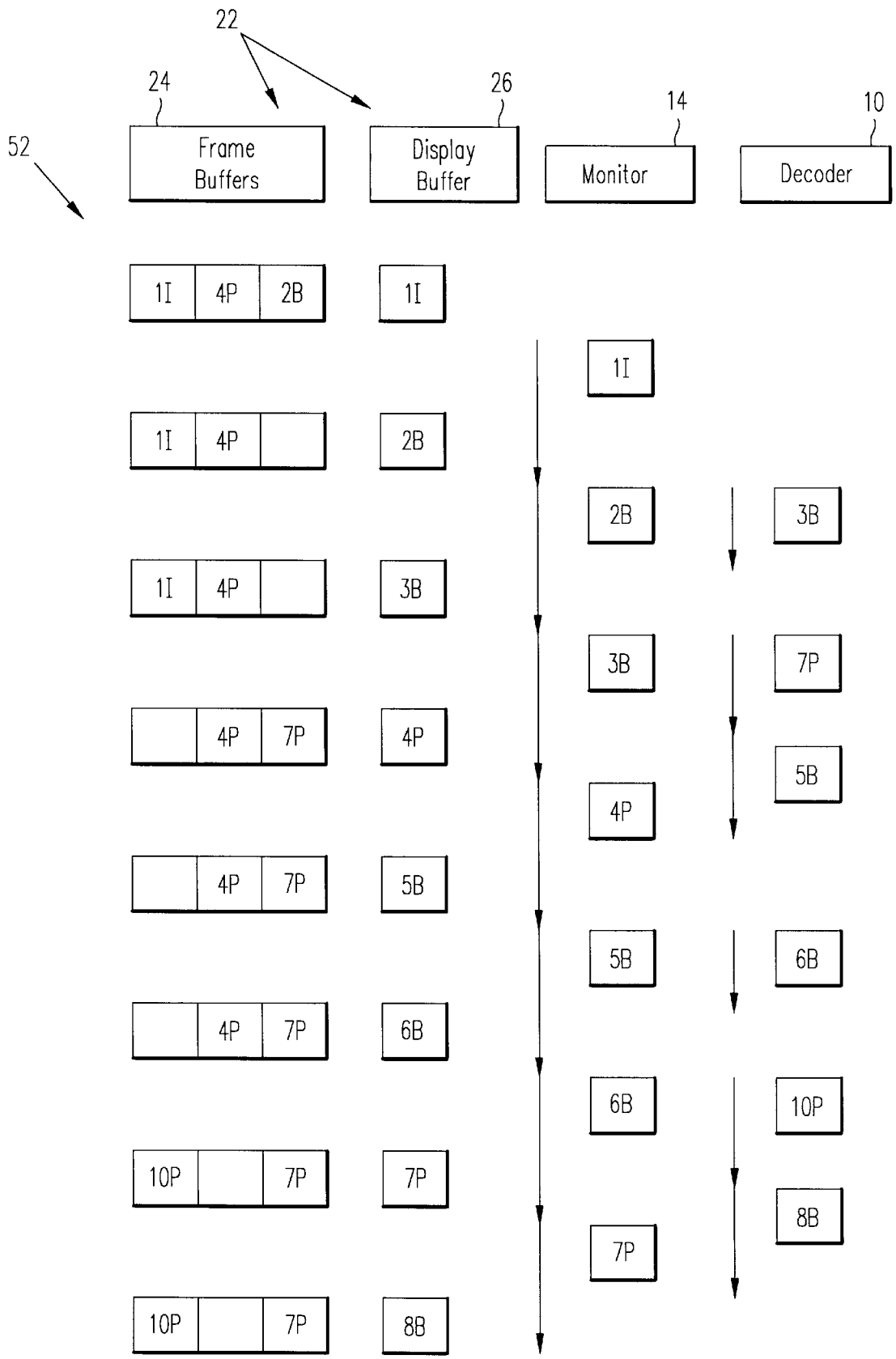
FIG. 2 is a pictorial timing diagram which illustrates the operation of a second embodiment of a four-buffer MPEG decoder for decoding MPEG video frames.

In an alternative embodiment of a four-buffer frame controller 52, one of the four frame buffers is dedicated to the purpose of displaying a frame. In this embodiment, three smaller frame buffers are used for storing and decoding data and one display buffer is allocated to reside in the common display buffer. Prior to each presentation, the frame to be displayed is moved from a frame buffer to the display buffer. The frame buffer is then available for storing another frame. Referring to FIG. 2, a pictorial timing diagram illustrates the operation of a four-buffer MPEG decoder for decoding MPEG video frames using the alternative embodiment of the four-buffer frame controller 52. Frame data are again decoded by a decoder 10, stored in four frame buffers 22, and displayed on the display screen or video graphics monitor 14. The four frame buffers 22 include three storage frame buffers 24 and a common display frame buffer 26.

Initially I-frame 1I, P-frame 4P and B-frame 2B have been decoded and are stored in the three storage frame buffers 24. The I-frame 1I is also initially stored in the common display frame buffer 26. In a first time frame, the I-frame 1I in the common display frame buffer 26 is displayed on the video graphics monitor 14 and B-frame 2B is moved from a buffer in the three storage frame buffers 24 to the common display frame buffer 26. In a second time frame, the B-frame 2B is displayed on the video graphics monitor 14, becomes obsolete, and is discarded. Also in the second frame, the decoder 10 decodes B-frame 3B and B-frame 3B is stored in the common display frame buffer 26. In a third time frame, the B-frame 3B is displayed on the video graphics monitor 14, becomes obsolete and is discarded, and a P-frame 7P is decoded by the decoder 10 and stored in a buffer of the three storage frame buffers 24. The I-frame 1I has been previously displayed and is no longer used for motion compensation and is therefore obsolete and discarded. Also in the third frame, the P-frame 4P is stored in the common display frame buffer 26 but still retained in the three storage frame buffers 24. In a fourth time frame, the P-frame 4P is displayed on the video graphics monitor 14 and the decoder 10 decodes the B-frame 5B, which is stored in a buffer of the common display frame buffer 26. In a fifth time frame, the B-frame 5B is displayed on the video graphics monitor 14, rendered obsolete and discarded while the decoder 10 decodes the B-frame 6B and stores the B-frame 6B in the common display frame buffer 26. In a sixth time frame, the B-frame 6B is displayed on the video graphics monitor 14, rendered obsolete and discarded, and the decoder 10 decodes the P-frame 10P and stores the P-frame 10P in a buffer of the three storage frame buffers 24. The P-frame 4P has been previously displayed and is no longer used for motion compensation and is therefore discarded. In a seventh frame, the P-frame 7P is displayed on the video graphics monitor 14 and the decoder 10 decodes the B-frame 8B, which is stored in the common display frame buffer 26.

The program code for freeing frame buffers is modified in this alternative embodiment by substituting the operation "TemporalReference[I]<=SmallestTempRef" for "TemporalReference[I]<SmallestTempRef".

The MPEG decoder buffer residing on the common display frame buffer is inaccessible when the common display buffer is scanned and is only available after the scan is complete, when an End-Of-Process (EOP) signal is generated.

The illustrative program code manages four frame buffers in an efficient manner. Video frames are successfully decoded prior to a scheduled presentation time, which is not achieved using a three-buffer decoder.

Figure 3:
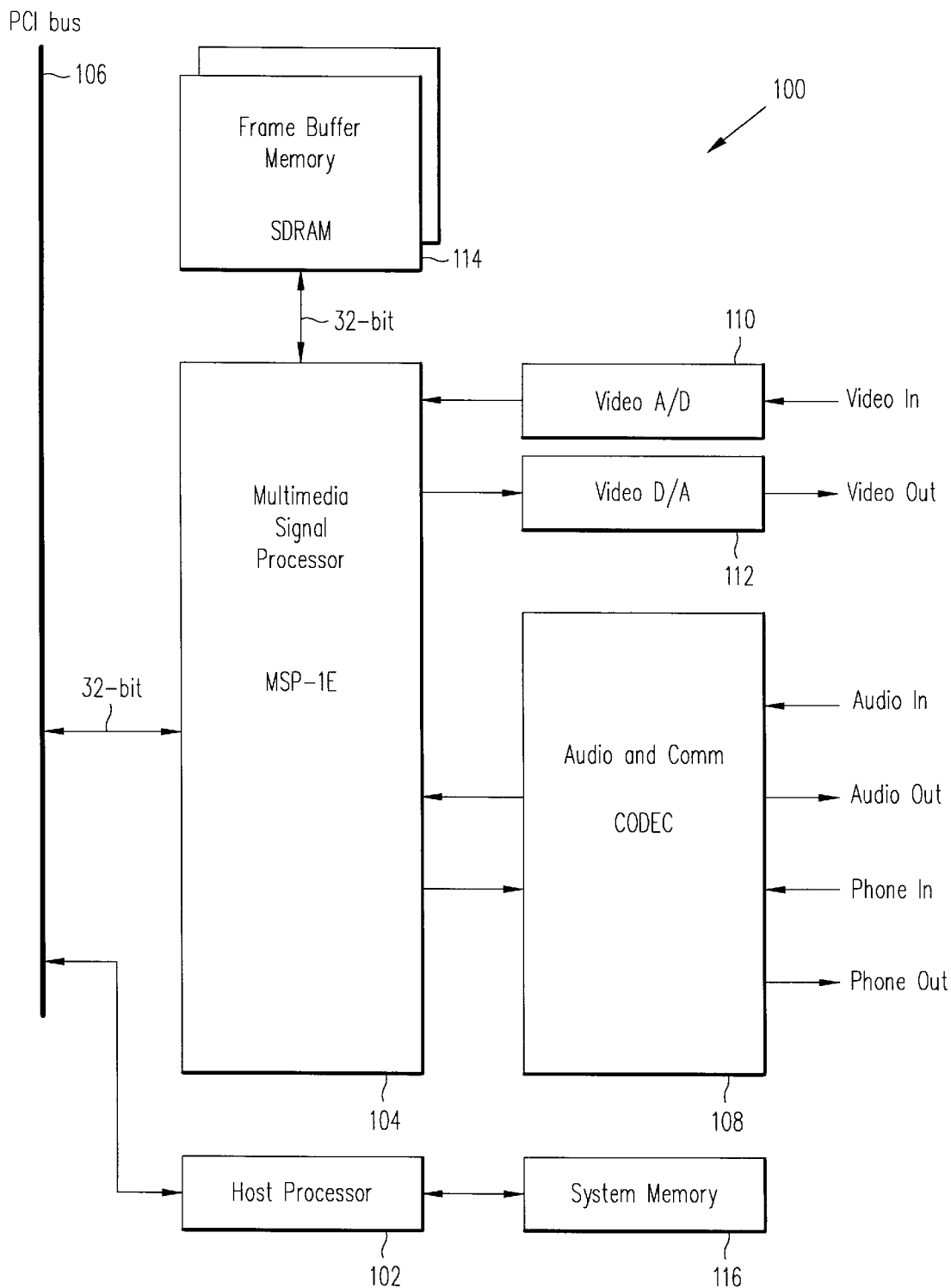
FIG. 3 is a high-level schematic block diagram illustrating a multimedia multiprocessor system in accordance with an embodiment of the present invention.

Referring to FIG. 3, a high-level schematic block diagram illustrates a multimedia multiprocessor system 100 which implements a four-buffer frame controller such as the four-buffer controllers 50 and 52. The multimedia multiprocessor system 100 includes a host processor 102 and a multimedia signal processor 104. A typical host processor 102 is an x86 processor such as a Pentium or Pentium Pro processor. The host processor 102 executes programs based on instructions and data held in a system memory 116. The host processor 102 communicates with the multimedia signal processor 104 via a system bus 106 such as a PCI bus. The multimedia signal processor 104 interfaces to various functional blocks such as an audio and communication CODEC 108, a video A/D converter 110, a video D/A converter 112, and a frame buffer SDRAM memory 114.

The four-buffer frame controller 50 performs a control method for managing four frame buffers in the frame buffer SDRAM memory 114. The four-buffer frame controller 50 decodes, displays and discards I-frames, P-frames and B-frames to accelerate video data decoding. The four-buffer frame controller 50 frees one frame buffer when the frame buffer contains obsolete data.

Figure 4:
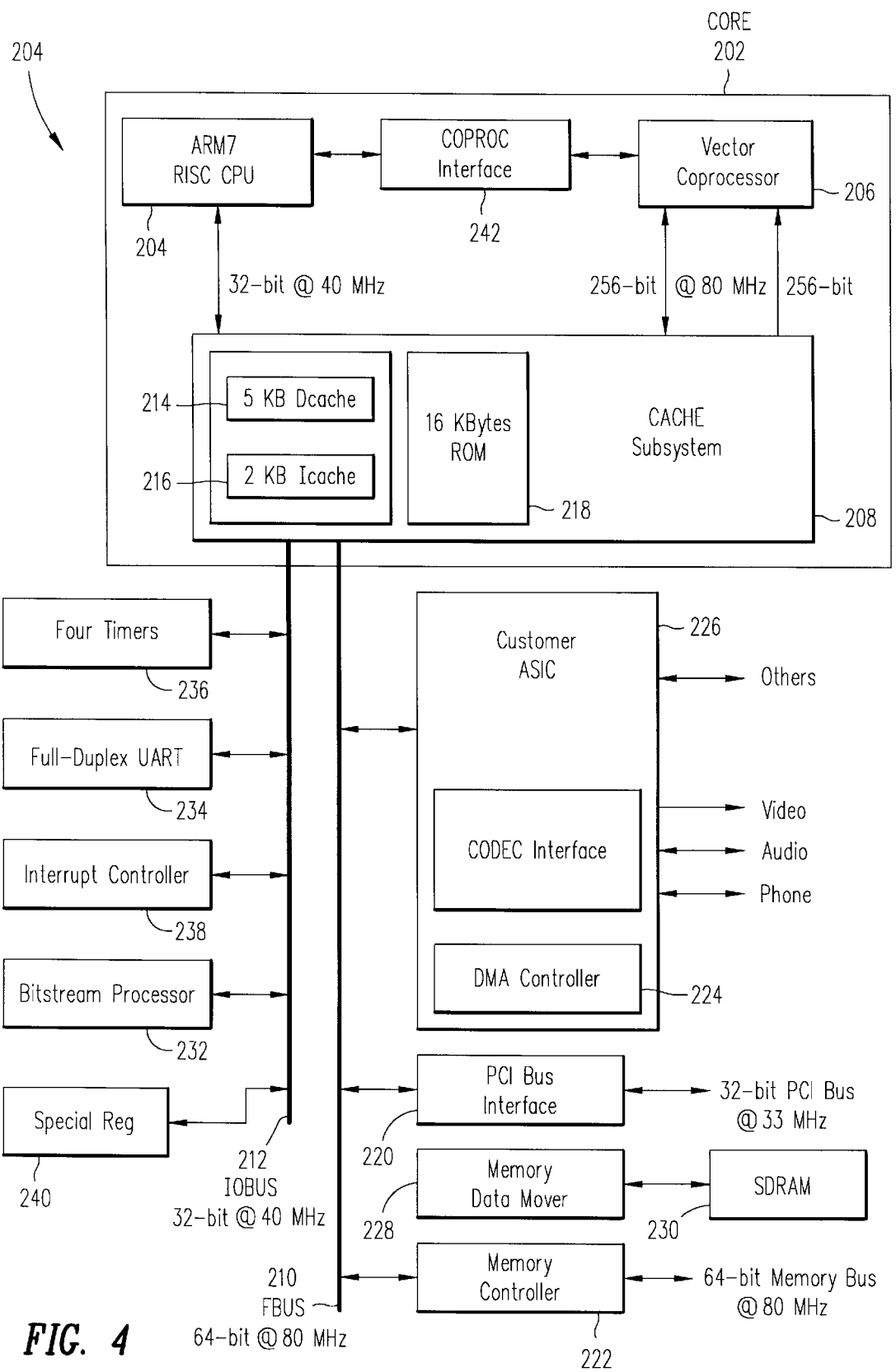
FIG. 4 is a schematic block diagram showing a multimedia signal processor included in the multimedia multiprocessor system illustrated in FIG. 3.

Referring to FIG. 4, a schematic block diagram shows the multimedia signal processor 104 within the multimedia multiprocessor system 100. The multimedia signal processor 104 includes a digital signal processor (DSP) core 202 which is connected to a plurality of multimedia interfaces.

The DSP core 202 is the computation engine of the multimedia signal processor 104 and includes a scalar processor 204, a vector processor 206, a cache subsystem 208, a fast bus (FBUS) 210, and an I/O bus 212. The scalar processor 204 is a scalar processor based on a 32-bit ARM7 control processor which is designed and manufactured by ARM Limited, Great Britain, and performs general processing functions such as real-time operating system operations, interrupt and exception handling, input/output device management, communication with the host processor 102 and the like. In one embodiment, the scalar processor 204 operates at 40 MHz. The scalar processor 204 interfaces to the vector processor 206 through a coprocessor interface 242.

The multimedia signal processor 104 performs multiple various multimedia operations. One multimedia operation is audio decoding so that the scalar processor 204 and the vector processor 206, in combination with program codes which operate on the processors, form an audio processor 205.

Figure 5:
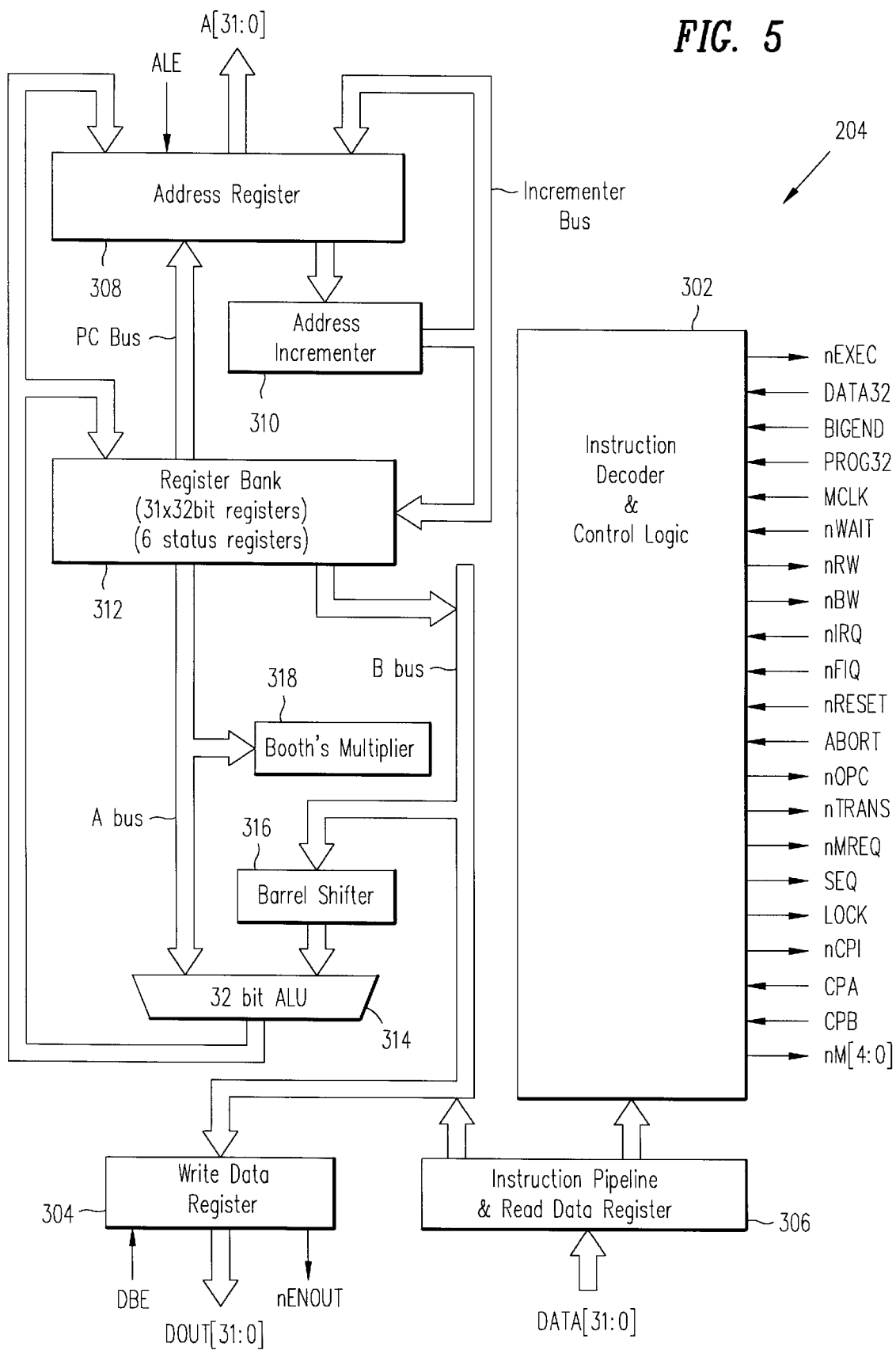
FIG. 5 is a schematic block diagram which illustrates a control processor in the multimedia multiprocessor system.

Referring to FIG. 5, a schematic block diagram illustrates the ARM7 scalar processor 204 which is controlled by an instruction decoder and control logic 302. The scalar processor 204 communicates with the cache subsystem 208 via a write data register 304 and an instruction pipeline and read data register 306. The scalar processor 204 includes an address register 308 and an address incrementer 310 for addressing data in a 31×32-bit register bank 312. The scalar processor 204 includes arithmetic logic such as a 32-bit ALU 314, a barrel shifter 316 and a Booth's multiplier 318. The coprocessor interface 242 is coupled directly to the instruction decoder and control logic 302 via nOPC, nCPI, CPA and CPB signal lines that communicate operation codes and instruction arguments between the scalar processor 204 and the vector processor 206 through the coprocessor interface 242.

Figure 6:
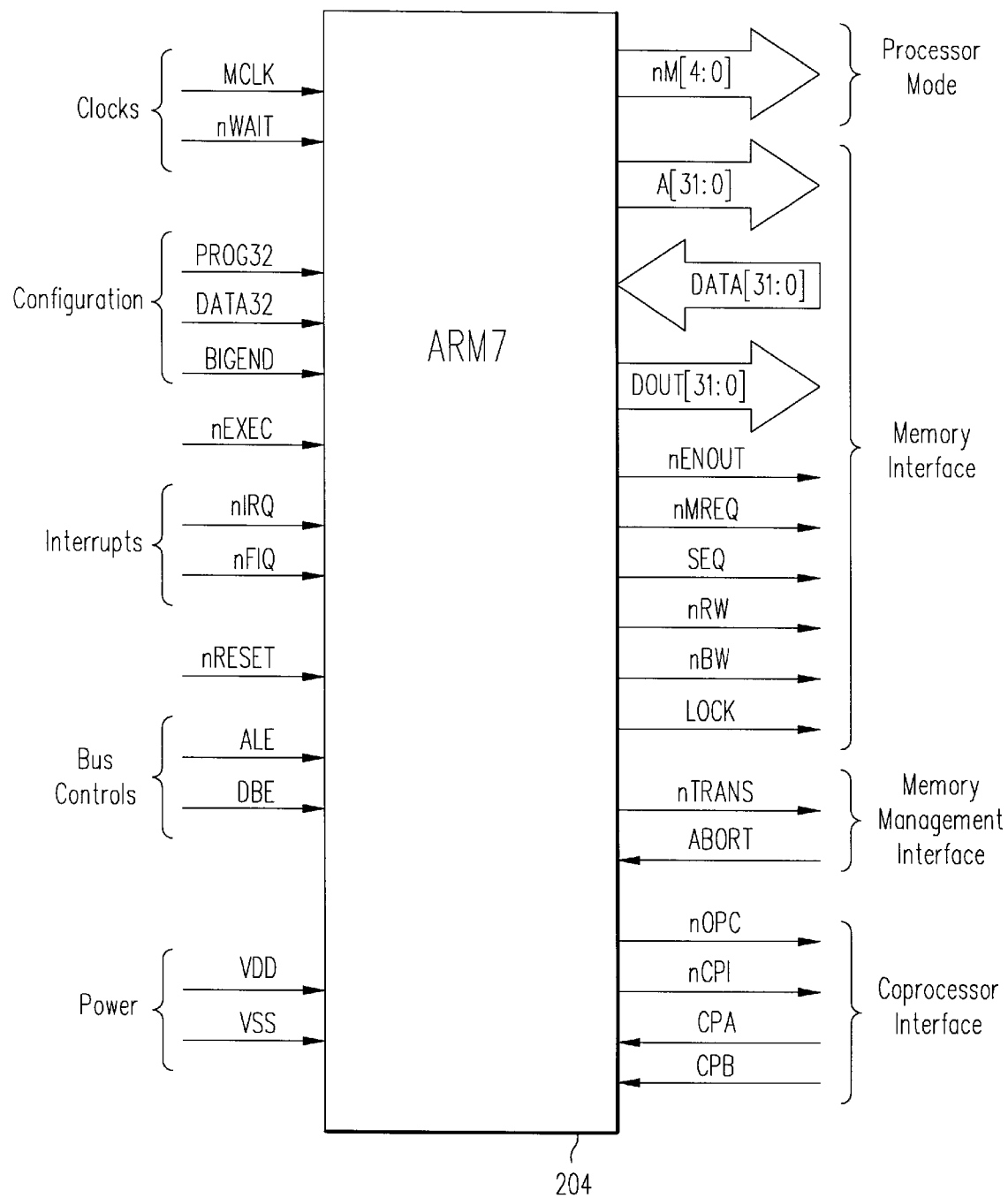
FIG. 6 is a functional diagram of the control processor.

FIG. 6 illustrates a functional diagram of the scalar processor 204. The scalar processor 204 executes scalar operations including indexing and conditional operations. The scalar processor 204 initiates operations of the vector processor 206. Specifically, the scalar processor 204 controls interactions with the vector processor 206 through extensions to the scalar processor 204 instruction set. The instruction set extensions include coprocessor data operations such as a STARTVP and a INTVP instruction, coprocessor data transfers, and coprocessor register transfers, such as a TEST-SET instruction and MFVP, MTVP, MFER and MTER instructions for reading and writing registers of the vector processor 206.

Referring again to FIG. 4, the vector processor 206 is the digital signal processing engine of the multimedia signal processor 104. The vector processor 206 has a Single-Instruction Multiple-Data architecture and includes a pipelined RISC engine that operates on multiple data elements in parallel to perform signal processing functions such as Discrete Cosine Transforms (DCT), FIR filtering, convolution, video motion estimation and other processing operations. The vector processor 206 supports vector arithmetic in which multiple data elements are operated upon in parallel, in the manner of a vector process, by a plurality of vector execution units. The vector processor 206 executes both scalar operations and combined vector-scalar operations. The multiple data elements of the vector processor 206 are packed in a 288-bit vector which is computed at a rate of thirty-two 8/9-bit fixed-point arithmetic operations, sixteen 16-bit fixed-point arithmetic operations, or eight 32-bit fixed-point or floating point arithmetic operations per cycle (for example, 12.5 ns). Most 32-bit scalar operations are pipelined at a rate of one instruction per cycle while most 288-bit vector operations are pipelined at a rate of one instruction in two cycles. Load and store operations are overlapped with arithmetic operations and are executed independently by separate load and store circuits.

Figure 7:
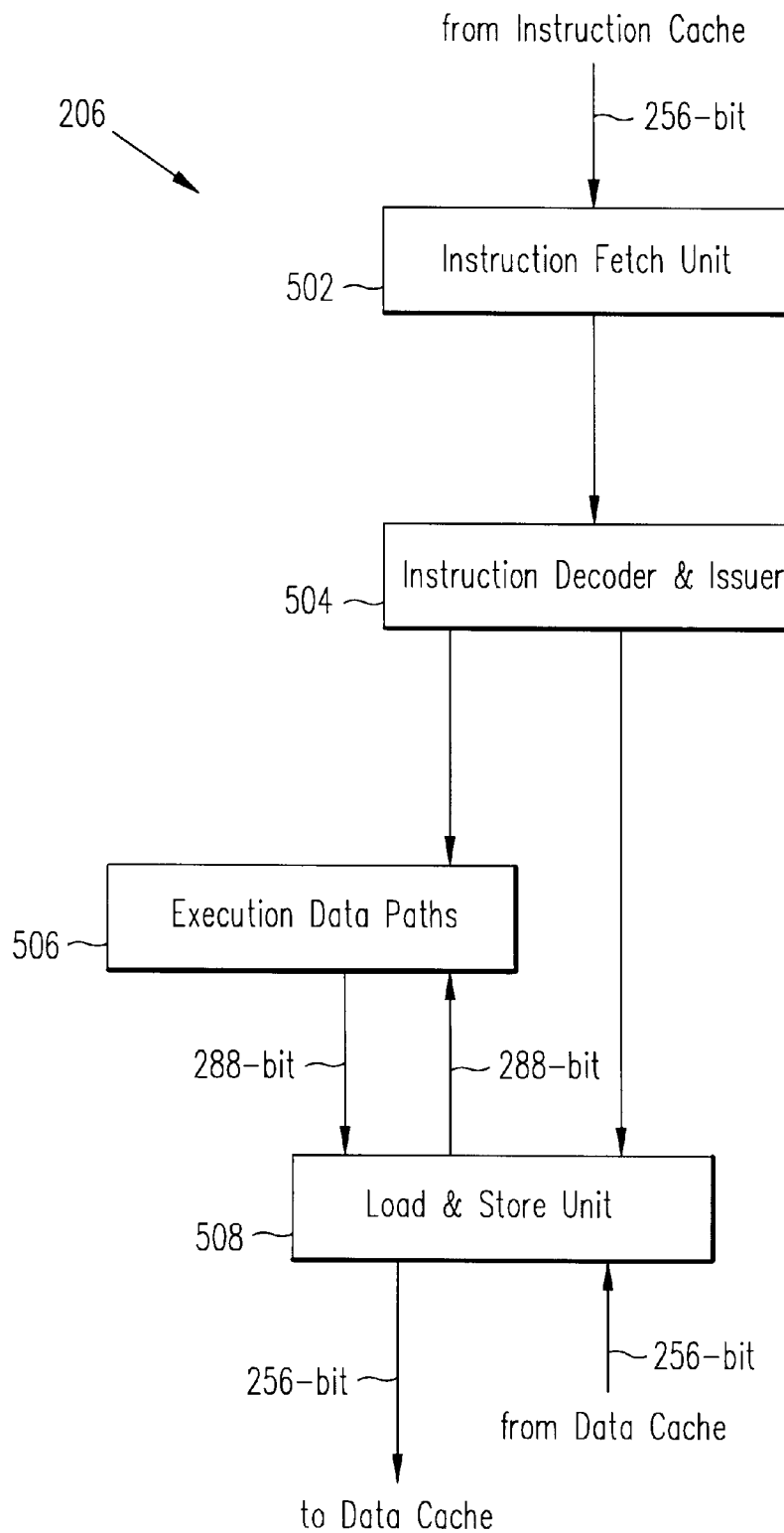
FIG. 7 is a schematic block diagram showing a vector processor in the multimedia signal processor illustrated in FIG. 4.

Referring to FIG. 7, the vector processor 206 has four functional blocks including an instruction fetch unit 502, an instruction decoder and issuer 504, an instruction execution data path 506, and a load and store unit 508. The instruction fetch unit 502 and the instruction decoder and issuer 504 are included in the vector processor 206 to allow the vector processor 206 to operate independently of the scalar processor 204.

The instruction fetch unit 502 prefetches instructions and processes control flow instructions such as Branch and Jump to Subroutine instructions. The instruction fetch unit 502 contains a 16-entry queue of prefetched instructions for the current execution stream and an eight-entry queue of prefetched instructions for the Branch target stream. The instruction fetch unit 502 receives up to eight instructions from the instruction cache in a cycle. The instruction decoder and issuer 504 decodes and schedules all instructions executed by the vector processor 206. The decoder processes one instruction in a cycle in the order of receipt from the instruction fetch unit 502, while the issuer schedules most instructions out-of-order depending on both the execution resource and operand data availability.

Figure 8:
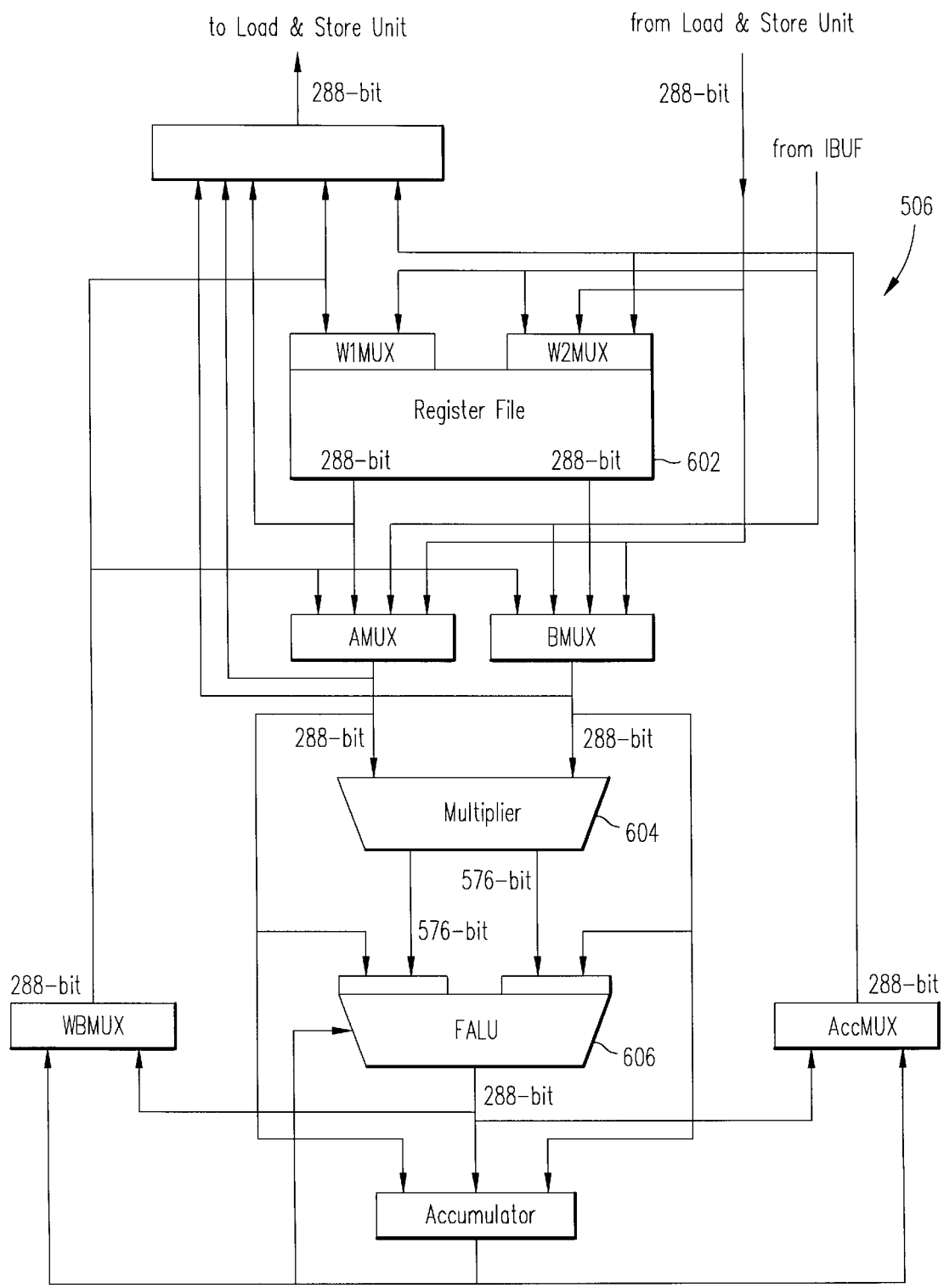
FIG. 8 is a schematic block diagram showing vector processor execution data paths of the vector processor illustrated in FIG. 7.

Referring to FIG. 8, the instruction execution data path 506 includes a four-port register file 602, eight 32×32 parallel multipliers 604, and eight 36-bit ALUs 606. The register file 602 supports two read operations and two write operations per cycle. The parallel multipliers 604 produce up to eight 32-bit multiplications in integer or floating point format, or sixteen 16-bit multiplications or thirty-two 8-bit multiplications per cycle. The ALUs 606 execute either eight 36-bit ALU operations in integer or floating point format, sixteen 16-bit ALU operations, or thirty-two 8-bit operations per cycle (for example, 12.5 ns).

The register file 602 includes a plurality of special-purpose registers and a plurality of return address registers. The special-purpose registers include a vector control and status register (VCSR), a vector program counter (VPC), a vector exception program counter (VEPC), a vector interrupt source register (VISRC), a vector and scalar processor synchronization register (VASYNC) and other registers such as various count, mask, overflow and breakpoint registers. The vector program counter (VPC) is the address of the next instruction to be executed by the vector processor 206.

Figure 9:
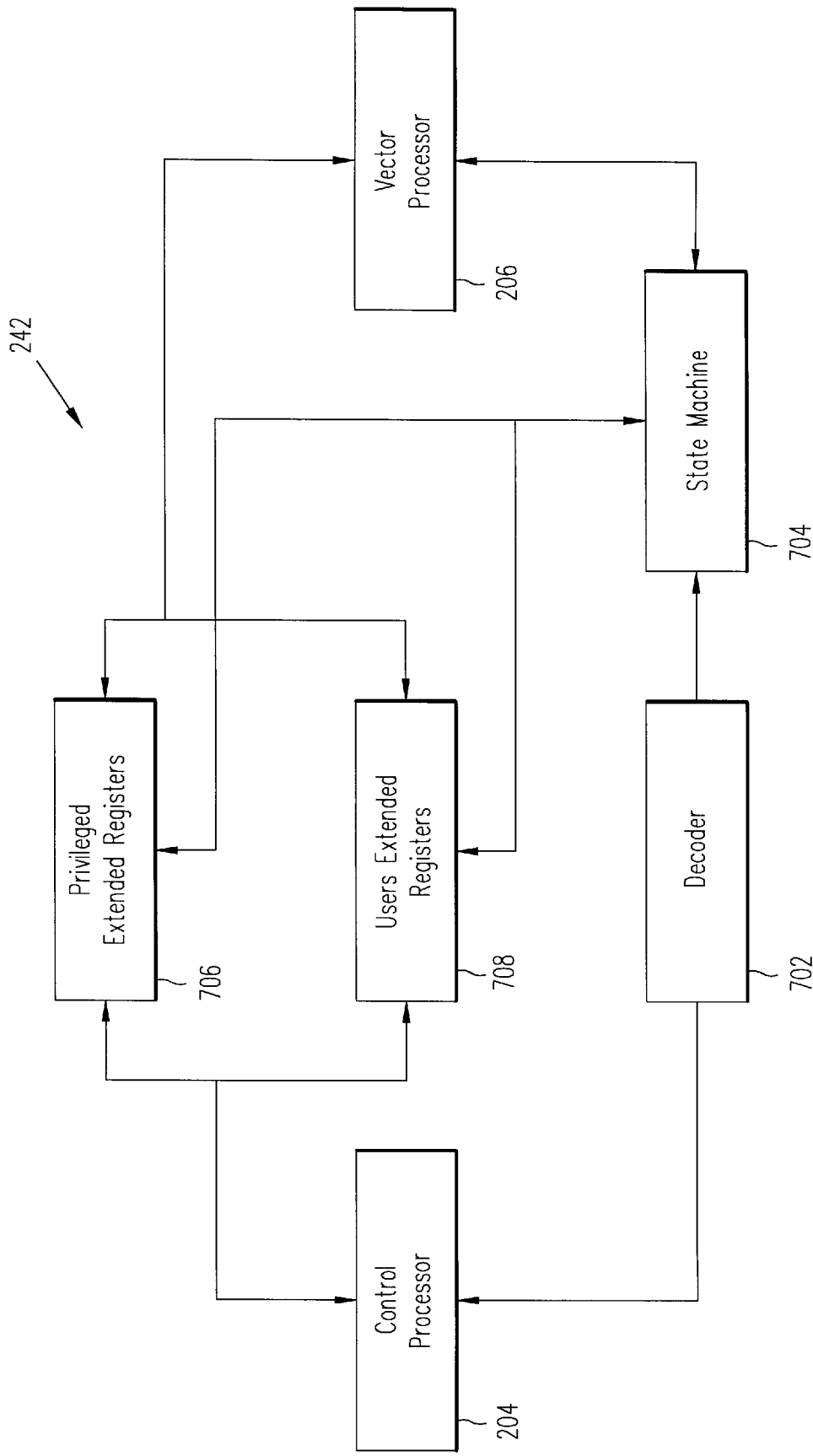
FIG. 9 is a schematic block diagram showing a coprocessor interface in the multimedia signal processor illustrated in FIG. 4.

A schematic block diagram of the coprocessor interface 242 is shown in FIG. 9. The coprocessor interface 242 supplements the functionality of the scalar processor 204, adding registers and logic functions for implementing instructions that extend the instruction set of the scalar processor 204. The coprocessor interface 242 includes registers for communicating between the scalar processor 204 and the vector processor 206. The coprocessor interface 242 also serves as a buffer for communicating data and signals between structures that operate at different clock rates. In one embodiment, the scalar processor 204 operates at a 40 MHz rate and the video presentation 2 executes at 80 MHz.

The coprocessor interface 242 includes a decoder 702, a state machine 704, a privileged extended register block 706, and a users extended register block 708. The registers in the privileged extended register block 706 and the users extended register block 708 are readable and writeable by the scalar processor 204 and by the vector processor 206. The decoder 702 decodes instructions of the scalar processor instruction set. The scalar processor instruction set includes instructions that are executable on the scalar processor 204 and extended instructions that are not executed by the scalar processor 204 but are instead executed by the coprocessor interface 242 to implement special coprocessor functionality. The decoder 702 decodes scalar processor instructions, detects extended instructions and supplies detected extension instructions to the state machine 704 for execution. The state machine 704 includes logic for implementing the extension instructions. The privileged extended register block 706 are extended registers which are accessed during execution of special instructions by the scalar processor 204.

Referring again to FIG. 4, the cache subsystem 208 includes a data cache 214 (for example, 5 KB), an instruction cache 216 (for example, 2 KB), and a cache ROM 218 (for example, 16 KB) and typically operates at the same speed as the vector processor 206 (80 MHz). In one embodiment, the cache subsystem 208 includes 1 Kbyte of instruction storage and 1 Kbyte of data storage for the scalar processor 204, 1 Kbyte of instruction storage and 4 Kbyte of data storage for the vector processor 206, and a shared 16 Kbyte of integrated instruction and data cache ROM for both the scalar processor 204 and the vector processor 206. The cache subsystem 208 interfaces to the scalar processor 204 through 32-bit data buses and interfaces to the vector processor 206 through 128-bit data buses. The cache ROM 218 includes uROM initialization software, self-test diagnostics software, various system management software, library routines and a cache for selected instructions and data constants. Specifically, the cache ROM 218 includes an instruction exception handler and input and output device interrupt handlers 0, 1, 2 and 3 for the scalar processor 204. The cache ROM 218 also includes a vector processor interrupt handler and a vector processor breakpoint exception handler which execute in the scalar processor 204.

The FBUS 210 interfaces to a plurality of FBUS peripherals including, for example, a 32-bit PCI bus interface 220, a 64-bit SDRAM memory controller 222, an 8-channel DMA controller 224, an ASIC logic block 226, and a memory data mover 228. The PCI bus interface 220 interfaces to the system bus 106 and operates, for example, at 33 MHz. The ASIC logic block 226 furnishes control logic for implementing custom functionality, as desired. The ASIC logic block 226, in one embodiment, supplies 10 Kgates including interfaces to various analog CODECs and customer-specific I/O devices. The memory data mover 228 transfers DMA data from the host processor 102 to SDRAM memory 230 which is local to the multimedia signal processor 104.

The I/O bus 212 interfaces to a plurality of I/O bus devices including, for example, a bit stream processor 232, a UART serial line 234, a timer circuit 236, an interrupt controller 238, and a special register 240. The bit stream processor 232 processes the video bit stream. The special register 240 is used for software-controlled initialization and interrupt handling.

Figure 10:
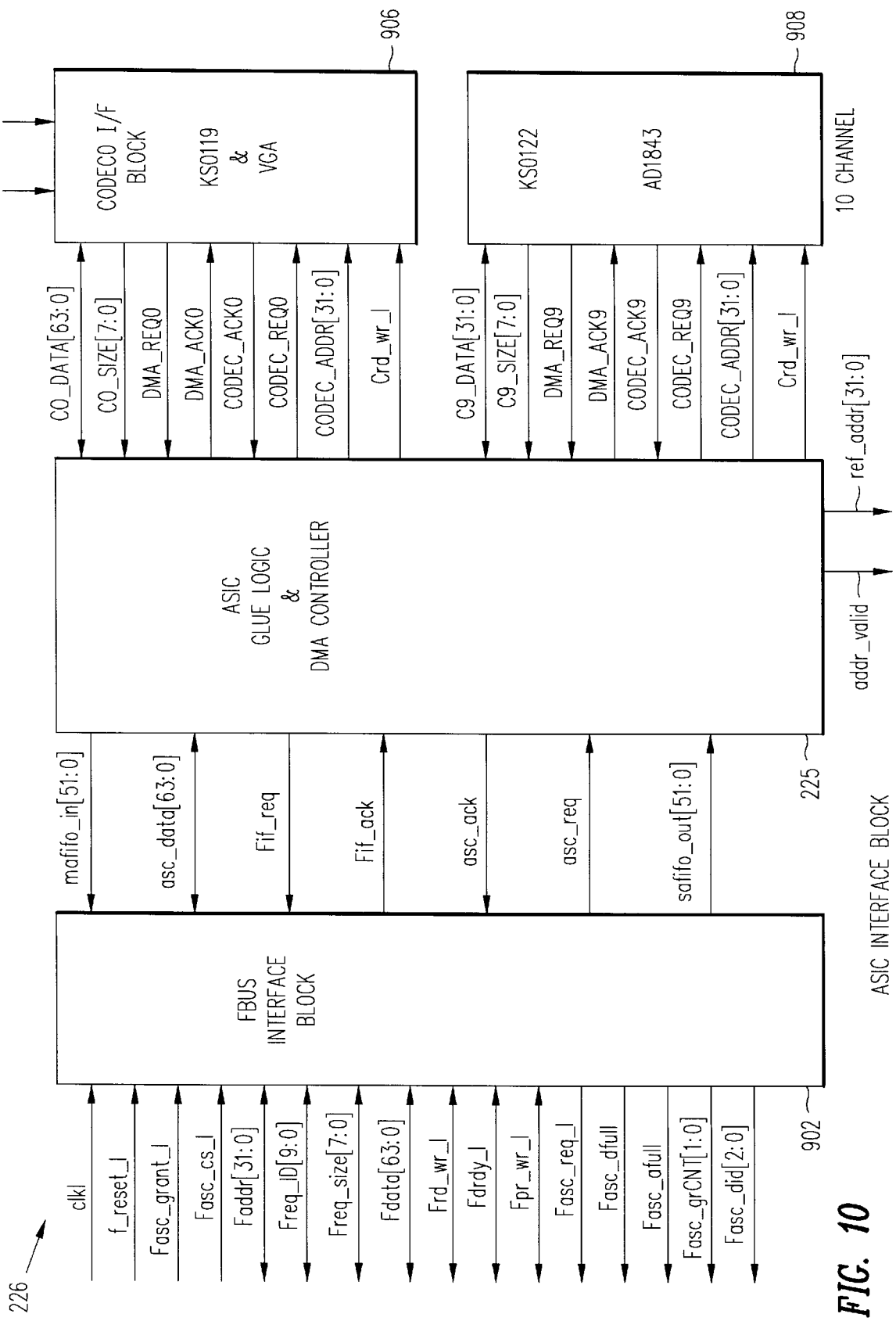
FIG. 10 it is a schematic block diagram illustrating an ASIC logic block of the multimedia signal processor.

Referring to FIG. 10, a schematic block diagram illustrates a more detailed view of the ASIC logic block 226 including an FBUS interface block 902, the DMA controller 225, a CODEC interface control block 906, and an audio interface 908.

In the illustrative embodiment, an audio end-of-process (aEOP) signal is generated by the DMA controller 224. Audio data is transferred from the SDRAM memory 230 to the audio interface 908. The amount of data that is transferred is monitored by the audio interface 908. The amount of data that constitutes a frame of data is known and signaled to the DMA controller 224. The DMA controller 224 generates an interrupt signal corresponding to the aEOP signal for each frame transferred. The interrupt signal is transferred to the scalar processor 204. One suitable audio interface 908 is a Serial-Port 16-bit SoundComm Codec AD1843 which is manufactured and sold by Analog Devices, Inc., Norwood, Mass. The AD1843 is a single-chip integrated speech, audio, fax and modem CODEC including highly configurable stereo sigma-delta analog-to-digital converters (ADCs) and quad sigma-delta digital-to-analog converters (DACs). The AD1843 supports thirteen analog input terminals and seven analog output terminals. The AD1843 includes on-chip signal filters including digital interpolation and digital decimation filters, and an analog output low-pass filter.

In the illustrative embodiment, a video end-of-process (vEOP) signal is also generated by the DMA controller 224. Frame buffer data is transferred from the SDRAM memory 230 to the CODEC interface control block 906, the CODEC interface control block 906 generates a vertical sync signal at approximately 70 Hz that is passed to the DMA controller 224. The DMA controller 224 generates an interrupt signal corresponding to the vEOP signal based on the timing of the vertical sync signal generated by the CODEC interface control block 906. The DMA controller 224 generates an interrupt signal corresponding to the vEOP signal for each video frame transferred. Accordingly the DMA controller 224 relays a signal indicative of video frame data transfer from the CODEC interface control block 906 to the scalar processor 204. One suitable CODEC interface control block 906 circuit is a KS0119 Video Encoder (Samsung Semiconductor) which combines NTSC encoding with conventional RAMDAC functions so that digitized video or computer-generated graphics are displayed on either NTSC or Personal Computer (PC) monitors. The KS0119 Video Encoder includes two data input channels to allow signal mixing with signal mixing also supported at an output terminal. The KS0119 Video Encoder supports NTSC CVBS, S-VIDEO, or RGB display.

A video frame is transmitted to a VGA monitor or other display device through the DMA controller 224. When an output request is made, the DMA controller 224 sends data to the display via an encoder (not shown). When the data transfer is complete, the DMA controller 224 generates a vEOP signal 22 designating the end of processing for the display request.

Figure 11:
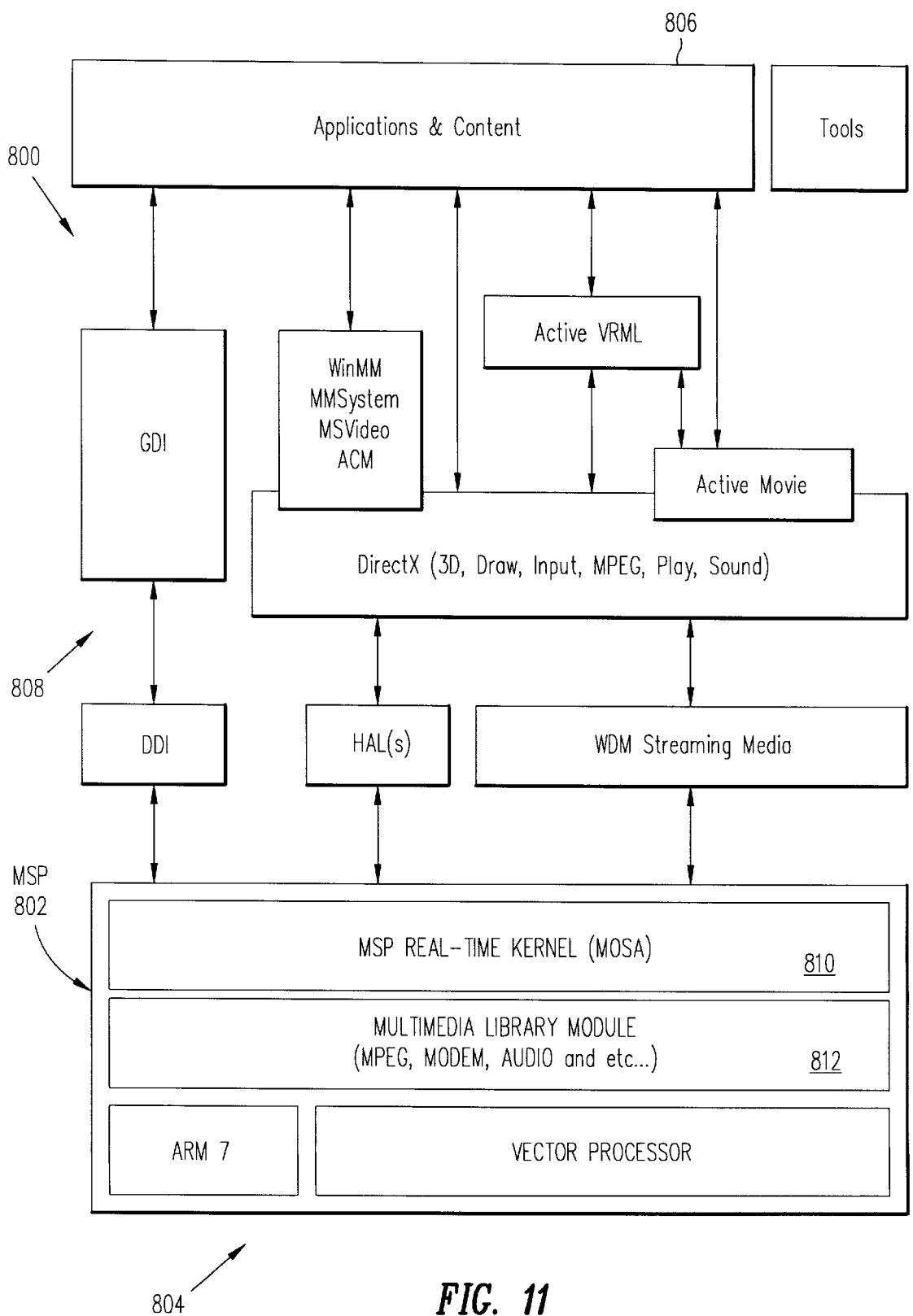
FIG. 11 is a schematic block diagram illustrating the software and firmware architecture of the multimedia signal processor.

Referring to FIG. 11, a schematic block diagram illustrates the software and firmware architecture 800 of the multimedia signal processor 104 including MSP system component software 802 executing on the multimedia signal processor 104 and PC applications and operating system software 808 executing on the host processor 102. The multimedia signal processor 104 is controlled by firmware including a vectorized-DSP firmware library 804 which executes on the vector processor 206 and a system management function block 806 which executes on the scalar processor 204. The a vectorized-DSP firmware library 804 and the system management function block 806 are included in MSP system component software 802. The architecture 800 advantageously separates signal processing functionality from host application control operations to simplify software development, improve software design management and reduce applications development and maintenance costs.

The MSP system component software 802 executes exclusively on the scalar processor 204 and includes an MSP real-time kernel 810, a multimedia library module 812, the system management function block 806 and the vectorized-DSP firmware library 804. The MSP real-time kernel 810 is typically responsible for interfacing to the host processor 102, resource management, I/O device handling and most interrupt and exception processing. The MSP real-time kernel 810 includes software for interfacing to Windows and Windows NT software executing in the host processor 102. The MSP real-time kernel 810 also includes software for selecting and downloading selected application firmware from the host processor 102, software for scheduling tasks for execution in the scalar processor 204 and the vector processor 206, and software for managing system resources of the multimedia signal processor 104 including memory and I/O devices. The MSP real-time kernel 810 includes software for synchronizing communication between tasks of the multimedia signal processor 104 and software for reporting MSP-related interrupt, exception and status conditions.

The a vectorized-DSP firmware library 804 performs substantially all digital signal processing functions. The a vectorized-DSP firmware library 804 also controls specific special interrupts such as a Coprocessor Interrupt which is issued by the scalar processor 204 to the vector processor 206, or a Hardware Stack Overflow Exception, which is generated within the vector processor 206.

The multimedia library module 812 performs communications-handling functions including data communication, MPEG video and audio, speech coding and synthesis, SoundBlaster-compatible audio and the like. The MSP real-time kernel 810 is a real-time, robust, multitasking, pre-emptive operating system including enhancements which facilitate multimedia applications executing on the multimedia signal processor 104.

The PC applications and operating system software 808 executing in the host processor 102 controls the multimedia signal processor 104 by reading and writing MSP control and status registers via the system bus 106, and writing to shared data structures that are resident to the system memory 116 and resident to the multimedia signal processor 104.

MSP program execution begins with the scalar processor 204 which executes a first execution stream. The scalar processor 204 may initiate a second independent execution stream in the vector processor 206. Operations of the scalar processor 204 and the vector processor 206 are synchronized through specific coprocessor instructions that operate in the scalar processor 204, including STARTVP, INTVP and TESTVP instructions, and special instructions executing in the vector processor 206, including VJOIN and VINT instructions. Data transfer between the scalar processor 204 and the vector processor 206 are performed using data movement instructions executed in the scalar processor 204.

While the invention has been described with reference to various embodiments, it will be understood that these embodiments are illustrative and that the scope of the invention is not limited to them. Many variations, modifications, additions and improvements of the embodiments described are possible. For example, the embodiments are described as systems which utilize a multiprocessor system including a Pentium host computer and a particular multimedia processor. Other processor configurations may be used in other embodiments. In addition, although the illustrative embodiments describe a video display system that controls a frame buffer memory including four frame buffers, in other embodiments the number of frame buffers may be greater than four.

What is claimed is:

1. An apparatus for preparing video signals for display in a computer system comprising:

a frame buffer memory including a plurality of frame buffers;

a video frame decoder coupled to the frame buffer memory, the video frame decoder decoding a frame data asynchronously with respect to a time frame; and a frame buffer controller that controls storage of frame data in the plurality of frame buffers, the frame buffer controller storing a first reference frame and a second reference frame in two of the plurality of frame buffers and storing, when available, a first nonreference frame and a second nonreference frame in a further two of the plurality of frame buffers, the frame buffer controller generating data for display from a frame buffer selected from among the two frame buffers storing the reference frames and the two frame buffers storing the nonreference frames on the basis of the frame that is due to be displayed, the frame buffer controller determining when a frame data is obsolete and discarding a frame data when the frame data is obsolete.

2. An apparatus according to claim 1 wherein:

the video frame decoder is an MPEG video decoder that decodes reference frame data including I-frame data and P-frame data, and decodes nonreference data including B-frame data, the video frame decoder performing motion compensation.

3. An apparatus according to claim 2 wherein:

the frame buffer controller determines that a nonreference frame data is obsolete at the time the nonreference frame data is displayed and determines that a reference frame data is obsolete at the time the reference frame data is displayed and no longer used for motion compensation.

4. An apparatus according to claim 1 wherein:

the frame buffer memory is accessed by a plurality of applications in a multitasking environment.

5. An apparatus according to claim 1 further comprising:

a graphics processor coupled to the frame buffer memory for post-processing the video data.

6. An apparatus according to claim 1 wherein:

the frame buffer controller is a program code routine for executing on a processor in a multiprocessor multimedia system.

7. An apparatus according to claim 1 further comprising:

an audio signal processor;

an audio signal path coupled to the audio signal processor;

a video signal path including the a frame buffer memory, the video frame decoder, and the video display monitor;

an audio/video synchrony controller coupled to the audio signal path and the video signal path.

8. A method of displaying video signals in a computer system comprising:

decoding a video frame data asynchronously with respect to a time frame;

controlling storage of video frame data in a plurality of frame buffers including:

storing a first reference frame and a second reference frame in two of the plurality of frame buffers and storing, when available, a first nonreference frame and a second nonreference frame in a further two of the plurality of frame buffers, generating data for display from a frame buffer selected from among the two frame buffers storing the reference frames and the two frame buffers storing the nonreference frames on the basis of which frame is due to be displayed;

determining when a video frame data is obsolete; and discarding a video frame data when the frame data is obsolete.

9. A method according to claim 8 wherein:

decoding the video frame data is an MPEG video decoding operation for decoding reference frame data including I-frame data and P-frame data, and for decoding nonreference frame data including B-frame data.

10. A method according to claim 8 further comprising:

performing motion compensation.

11. A method according to claim 10 wherein:

determining when a video frame data is obsolete includes asserting that a nonreference frame data is obsolete at the time the nonreference frame data is displayed and asserting that a reference frame data is obsolete at the time the reference frame data is displayed and no longer used for motion compensation.

12. A method according to claim 8 further comprising:

accessing the frame buffer memory by a plurality of applications in a multitasking environment.

13. A method according to claim 8 further comprising:

post-processing the video data.

14. A method according to claim 8 wherein:

controlling storage of video frame data is executed as a program code routine for executing on a processor in a multiprocessor multimedia system.

15. A multimedia system comprising:

a processor;

a frame buffer memory including a plurality of frame buffers;

a video frame decoder coupled to the frame buffer memory, the video frame decoder decoding a frame data asynchronously with respect to a time frame; and a frame buffer controller that controls storage of frame data in the plurality of frame buffers, the frame buffer controller storing a first reference frame and a second reference frame in two of the plurality of frame buffers and storing, when available, a first nonreference frame and a second nonreference frame in a further two of the plurality of frame buffers, the frame buffer controller generating data for display from a frame buffer selected from among the two frame buffers storing the reference frames and the two frame buffers storing the nonreference frames on the basis of which frame is due to be displayed, the frame buffer controller determining when a frame data is obsolete and discarding a frame data when the frame data is obsolete.

16. A multimedia system according to claim 15 wherein:

the video frame decoder is an MPEG video decoder that decodes reference frame data including I-frame data and P-frame data, and decodes nonreference data including B-frame data, the video frame decoder that performs motion compensation.

17. A multimedia system according to claim 15 wherein:
the frame buffer controller determines that a nonreference frame data is obsolete at the time the nonreference frame data is displayed and determines that a reference frame data is obsolete at the time the reference frame data is displayed and no longer used for motion compensation.

18. A multimedia system according to claim 15 wherein:
the frame buffer memory is accessed by a plurality of applications in a multitasking environment.

19. A multimedia system according to claim 15 wherein:
a graphics processor coupled to the frame buffer memory for post-processing the video data.

20. A multimedia system according to claim 15 wherein:
the frame buffer controller is a program code routine for executing on a processor in a multiprocessor multimedia system.

21. A multimedia system according to claim 15 further comprising:
an audio signal processor;
an audio signal path coupled to the audio signal processor;
a video signal path including the a frame buffer memory, the video frame decoder, and the video display monitor;
an audio/video synchrony controller coupled to the audio signal path and the video signal path.

22. A method of providing multimedia system comprising:
providing a processor;
providing a frame buffer memory including a plurality of frame buffers;
a video frame decoder coupled to the frame buffer memory, the video frame decoder that decodes a frame data asynchronously with respect to a time frame; and
providing a frame buffer controller that controls storage of frame data in the plurality of frame buffers, the frame buffer controller storing a first reference frame and a second reference frame in two of the plurality of frame buffers and storing, when available, a first nonreference frame and a second nonreference frame in a further two of the plurality of frame buffers, the frame buffer controller that generates data for display from a frame buffer selected from among the two frame buffers storing the reference frames and the two frame buffers storing the nonreference frames on the basis of which frame is due to be displayed, the frame buffer controller that determines when a frame data is obsolete and discards a frame data when the frame data is obsolete.

23. An apparatus for preparing video signals for display in a computer system comprising:
a frame buffer memory including a plurality of frame buffers;
a video frame decoder coupled to the frame buffer memory, the video frame decoder that decodes a frame data asynchronously with respect to a time frame; and
a frame buffer controller that controls storage of frame data in the plurality of frame buffers, the frame buffer controller storing up to four frames of frame data in the plurality of frame buffers, a decoded data frame being stored in a vacant frame buffer that has previously discarded frame data, the frame buffer controller generating data for display from a frame buffer holding frame data that is due to be displayed, the frame buffer controller determining when a frame data is obsolete and discarding a frame data when the frame data is obsolete.

24. An apparatus according to claim 23 wherein:
the frame buffer controller determines that a nonreference frame data is obsolete at the time the nonreference frame data is displayed and determines that a reference frame data is obsolete at the time the reference frame data is displayed and no longer used for motion compensation.

* * * * *